United States Patent [19]
Naimark et al.

[11] Patent Number: 5,816,823
[45] Date of Patent: Oct. 6, 1998

[54] INPUT DEVICE AND METHOD FOR INTERACTING WITH MOTION PICTURES INCORPORATING CONTENT-BASED HAPTIC FEEDBACK

[75] Inventors: Michael Naimark, San Francisco; Robert L. Adams, Palo Alto; Robert D. Alkire, San Jose, all of Calif.; Christoph Dohrmann, Karlsruhe, Germany; David J. Gessel, San Francisco; Steven E. Saunders, Cupertino, both of Calif.

[73] Assignee: Interval Research Corporation, Palo Alto, Calif.

[21] Appl. No.: 728,102

[22] Filed: Oct. 9, 1996

Related U.S. Application Data

[63] Continuation of Ser. No. 292,396, Aug. 18, 1994, abandoned.

[51] Int. Cl.[6] .................................................. G09B 5/00
[52] U.S. Cl. ..................... 434/307 R; 434/365; 434/114; 73/379.01; 345/156; 463/30
[58] Field of Search ............................... 434/247, 307 R, 434/308, 309, 350, 365, 112–114; 348/14, 121, 123; 345/7–9, 121, 156, 157, 161, 163, 167, 427, 435, 302; 340/686; 73/379.01; 463/30, 37, 38

[56] References Cited

U.S. PATENT DOCUMENTS

| | | |
|---|---|---|
| 4,857,902 | 8/1989 | Naimark et al. . |
| 5,044,956 | 9/1991 | Behensky et al. . |
| 5,184,319 | 2/1993 | Kramer .............................. 364/578 X |
| 5,185,561 | 2/1993 | Good et al. ......................... 345/156 X |
| 5,189,355 | 2/1993 | Larkins et al. . |
| 5,189,402 | 2/1993 | Naimark et al. . |
| 5,191,320 | 3/1993 | MacKay . |
| 5,229,756 | 7/1993 | Kosugi et al. ....................... 273/438 X |
| 5,270,694 | 12/1993 | Naimark et al. . |
| 5,319,387 | 6/1994 | Yoshikawa .............................. 345/179 |
| 5,320,538 | 6/1994 | Baum ................................. 434/307 R |
| 5,389,865 | 2/1995 | Jacobus et al. ........................ 395/95 X |
| 5,709,219 | 1/1998 | Chen et al. ............................. 600/453 |
| 5,734,373 | 3/1998 | Rosenberg et al. ..................... 345/161 |

FOREIGN PATENT DOCUMENTS

0565143 A2   10/1993   European Pat. Off. .

OTHER PUBLICATIONS

Imax® Simulator Ride, Imax® Ridefilm by Imax Corp. and Ridefilm Corp. (3 brochures), 1994.
"Virtual Environment Display System" by Fisher et al., ACM 1986 Workshop on Interactive 3D Graphics, Oct. 23–24, pp. 1–11.

*Primary Examiner*—Joe Cheng
*Attorney, Agent, or Firm*—David R. Graham

[57] ABSTRACT

An input device and method for interacting with motion pictures incorporating content-based haptic response is provided. Content data relating to the motion picture is stored in a content data storage device while motion picture data is stored in a prerecorded image data storage device. A viewer input device is provided so that a viewer (end-user) can move forwards and backwards through the frames on a display screen while substantially simultaneously, the content data is accessed and braking commands are sent to the viewer input device. The result is that the viewer is provided with haptic responses to the viewer's input through the viewer input device.

13 Claims, 7 Drawing Sheets

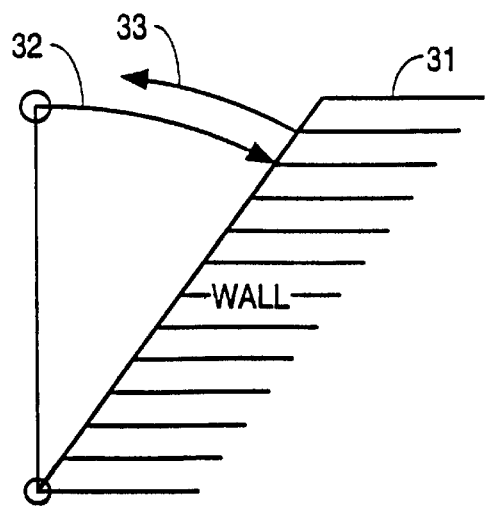
FIG. 5
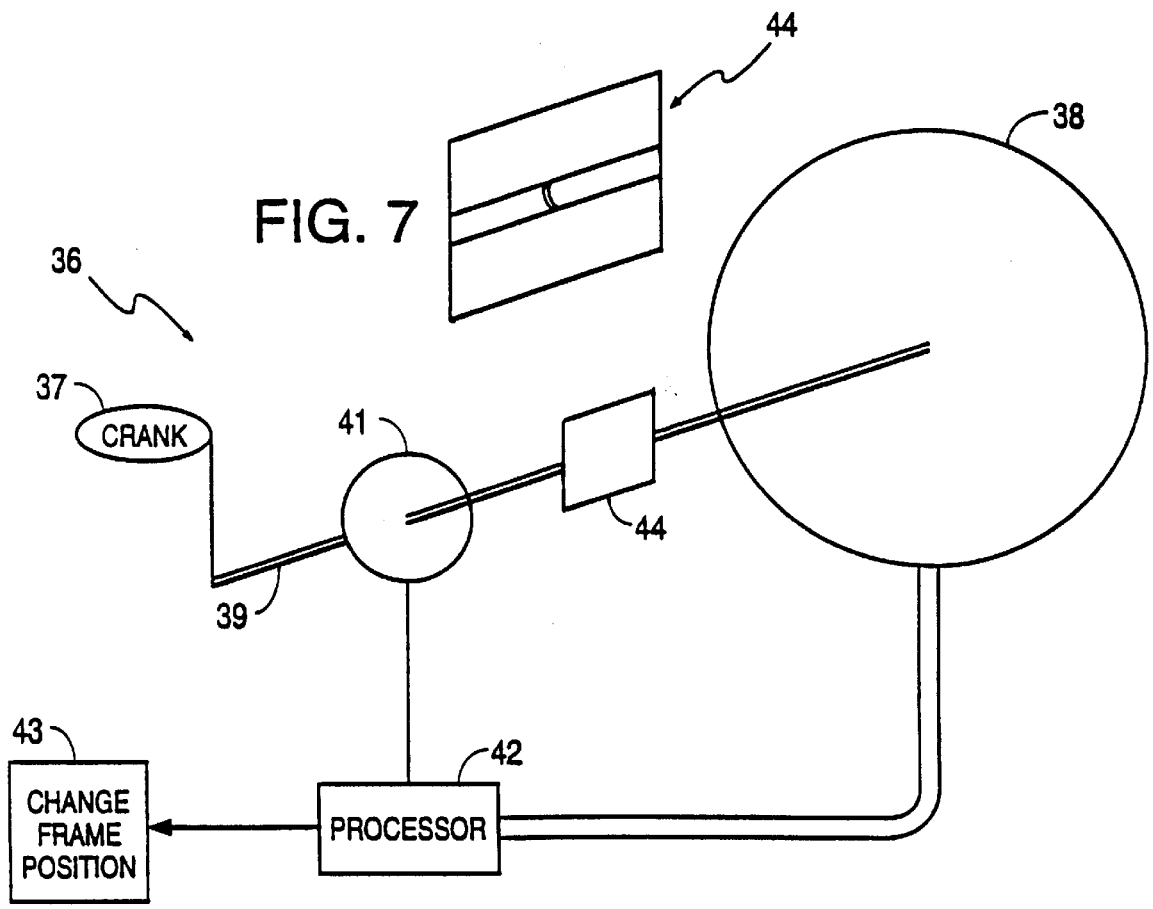
FIG. 7
FIG. 6

INPUT DEVICE AND METHOD FOR INTERACTING WITH MOTION PICTURES INCORPORATING CONTENT-BASED HAPTIC FEEDBACK

This application is a continuation of application Ser. No. 08/292,396, filed Aug. 18, 1994, now abandoned.

FIELD OF THE INVENTION

The present invention relates to haptic devices and more particularly, to an apparatus and method for providing the viewer of prerecorded visual data a way in which to receive a sensory response which is correlated to and dependent on the prerecorded visual data, through an input device which the viewer uses to browse the prerecorded visual data.

BACKGROUND OF THE INVENTION

Since the first motion pictures there have been devices which provide viewers of movies the ability to advance the individual frames of images, thus causing the motion pictures. Originally, crank arms were used to advance the frames. Early motion pictures were typically "hand-cranked" at 16–18 frames per second (fps); today's motion pictures run at 24 or 25 fps; various "special venue" film formats run at 48 and 60 frame; and video runs at 50 or 60 fps. In all cases, the playback fps rate is held constant and equal to the recorded frame rate to convey the sense of real-time motion.

On the other hand, in the editing process, control over the frame rate is desirable. In an editing application, knobs are commonly used as input devices to advance the images and cause the variable frame rate. During the course of movie editing, the editor needs to move back and forth through the film or video material to determine the exact locations to cut, or edit. The better control that the editor has over this back and forth motion, the more effective the editing process. Several examples of this control ranges from hand-cranking film on open reels to sophisticated electronic controllers for video.

The use of tactile or haptic feedback is advantageous in video tape recording and editing equipment to provide the user with a "feel" representative of the type of control or operation being effected. Force-feedback circuitry is used to provide the operator with tactile feedback. Force-feedback may be created by a computer-controlled rate of friction or movement of an object. In the case of a rotary knob, force-feedback may be created with an on-off brake, a variable brake, or a motor.

In video editing systems, two fundamentally different modes of edit control exist: "shuttle" and "jog." A shuttle control is typically a spring-loaded rotary knob which controls frame rate (i.e., each unique position of the knob corresponds to a unique frame rate). A jog control is typically a free-turning rotary knob which controls frame position (i.e., progressive turning of the knob progressively moves backwards or forwards from one frame to the next). One functional distinction is that a shuttle knob may be held in a non-zero static position which result in a non-zero frame rate while a jog knob must be moving to result in a non-zero frame rate. In other words, a shuttle controls the frame rate while a jog controls the frame position.

Editing, in all cases, is interactive only for the editor. Once the editing is completed, the viewer is a non-interactive recipient of the completed linear program. Other than the ability to vary the frame rate using jog or shuttle controls, currently there is no system or method which provides tactile interactivity between the viewer and the movie.

In viewing movies while varying the frame rate, it would be advantageous to provide the viewer with haptic responses to his or her input which are dependent on the content of the movie. These haptic responses may be referred to as content-dependent, content-based, content-triggered and/or content-driven responses. For example, the viewer could then experience boundary constraints, textures and hills in combination with speed. While content-dependent tactile (haptic) response may not be particularly desirable with respect to conventional movies, those movies made for end-user frame rate control or "browsing" would be well suited to be viewed on a system which was capable of providing content-dependent haptic responses to viewer input.

The types of movies which are particularly suited to providing content-dependent haptic responses to viewer input include those movies made for surrogate travel, virtual travel, "moviemaps", "browseable movies", and "navigable movies". Also, browseable video exists and includes collections of stillframes, such as slide libraries, which are stored on videotape or disc. Since the stillframes are stored in a one-dimensional sequence, they also have no correct viewing rate, but rather demand user-control for getting from one frame to another.

SUMMARY OF THE INVENTION

In contrast to the available systems described above, the present invention provides a system and method for taking into account various aspects of the medium's content, such as edit points and other boundaries. Moreover, the quality of the "route" through which one "travels," such as rockiness or uphill/downhill grades, are also movie content for which the present invention accounts. According to the present invention, content-dependent data is composed and stored on a data storage device. The content-dependent data can either be manually entered or machine detectable and therefore entered automatically.

In setting up the system in the manual context, an operator views the prerecorded image data on a visual data display at either its real-time speed or a slower or faster frame rate. Using commands, the operator, through a content input device, sends content signals to a content data storage device where they are stored for use during a viewer's use of the apparatus.

When a viewer views the prerecorded image data on the visual data display, the viewer is able to advance the frames by turning, for example, a knob which is the viewer input device. The viewer input device communicates with a processor which is in turn communicates with the content data storage device.

According to the present invention, the viewer input device substantially and immediately responds to the viewer's input in a haptic manner, based on content-dependent data stored in the content data storage device which corresponds to the prerecorded visual data displayed on said visual data display at a particular time.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 5 depicts a braking position such as a "wall" wherein the viewer input device will be stopped and bounced back upon impact;

FIG. 6 depicts a viewer input device in communication with a brake;

FIG. 7 is a blow up of the flex coupling device depicted in FIG. 6;

FIG. 11 shows a typical pulse width modulation which is capable of signalling the brake to turn off and on;

DETAILED DESCRIPTION OF THE INVENTION

The present invention includes a system and method for composing content data which is correlated with prerecorded visual data so that it can be played back as a viewer "browses" through the frames. Moreover, the present invention further includes a system and method for providing a viewer with the ability to experience in a haptic manner the content of the video as he or she uses the viewer input device to browse through the frames.

Figure 1:
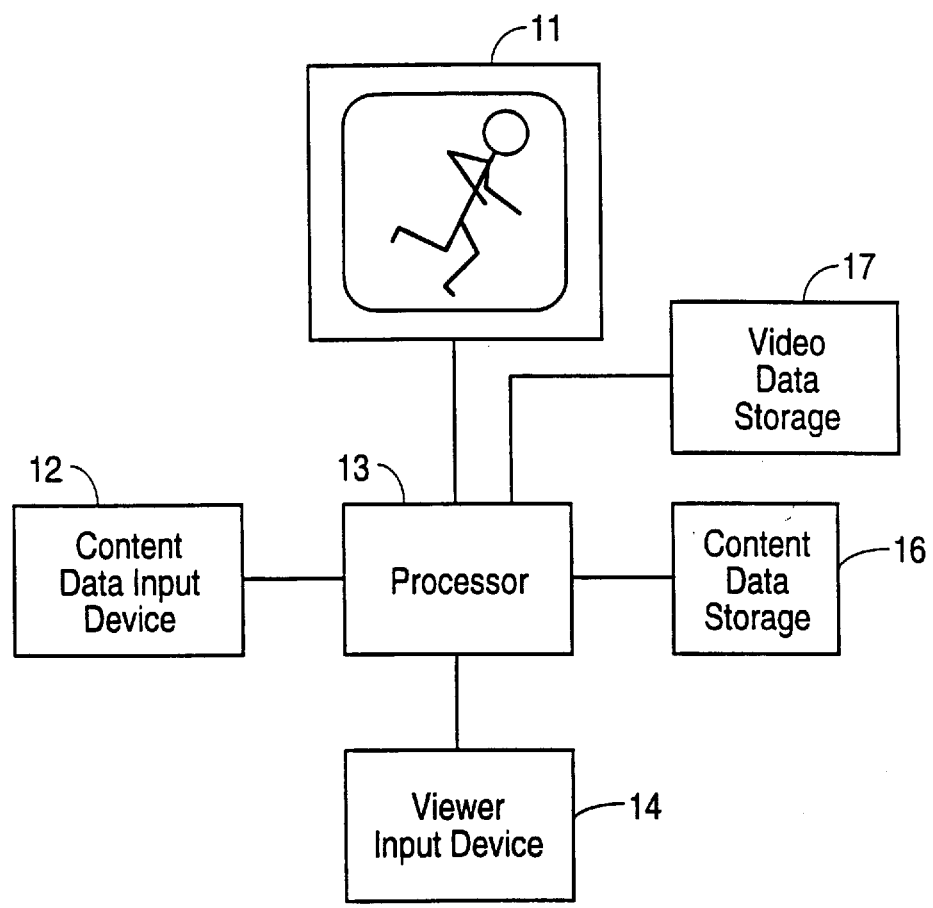
FIG. 1 is a schematic showing some of the features of the present invention.

Turning to FIG. 1, a combined system is shown. That is, the schematic includes both the creation hardware and the play back hardware. These systems are more typically separated into two different systems but are combined in FIG. 1 for economy. In both the creation and the play back systems, the prerecorded medium is viewed on a display apparatus 11.

In the composition mode, the operator views the apparent motion of the prerecorded image data at a speed which is suitable for composing content data. A content data input device 12 may be any type of input device, such as a key board or mouse and can be in communication with another display device (not shown). As the operator views the prerecorded image data, the operator can determine which types of content characteristics are applicable to that data. For example, in composing content data, the operator finds edit-points, enters those points into a software program and then enters boundary constraints such as beginning points and end points.

On the other hand, instead of the operator composing the content data by hand and hand entering it into the system, the content data may also be composed by machine. That is, it can be automatically composed. For example, when the prerecorded visual data is being shot, the camera or camera rig can include sensors which sense the texture of a road or the uphill/downhill characteristics of the road. That information can be stored on the film stock so that when the film is played back, the content information is retrieved at the same time that the film is played. That content information can then be interpreted into braking commands and stored in a content data storage 16. Alternatively, a sophisticated software program can be used to detect certain conditions to characterize those conditions, and to interpret them into brake commands which are stored in content data storage 16.

As mentioned above, particular types of prerecorded visual data are well suited for haptic feedback in accordance with the present invention. For example, moviemaps, dollies and timelapses are particularly browseable. Moviemaps are distance-triggered sequences (triggered by using an encoder on the wheel of a camera rig and a camera capable of recording single-frames such as one frame every meter) where the camera is pointing in the direction of movement; the effect is "moving forward." Dollies are distance-triggered sequences with a camera pointing sideways to the direction of motion while for example, carefully arcing the camera around a sculpture recording one frame per degree of arc provide browseable footages. Timelapses are time-triggered sequences with a stationary camera but where time intervals are exaggerated (such as by recording one frame per minute for 24 hours).

Unlike conventional video, in the above discussed browseable movie applications, there is no "correct" frame rate at which to view such footage. By providing an end-user control, the viewer feels a sense of movement or travel through the visual material. In a moviemap, where the is taken from a car as the car was moving in the forward direction down a road, content data could be created so that it is correlated to dips and bumps the footage has captured as the car advances. In that case, data simulating the texture of the ride in the car is created.

On the other hand, where the footage is taken from the front of a bicycle which was moving in the forward direction up a hill, the content data could be created so that it is correlated to the effects of gravity on the rider as the bicycle advances. In that case, data simulating the pull of gravity on the bicycle is created.

Moreover, the footage may be taken from a skateboard as it was ridden through a concrete skateboard course. As the skateboard advances up one of the curved walls of the course, it reaches a point where it has lost momentum and therefore can go no further in that particular direction. The skateboarder would then change direction and head down the same curved wall, continuing in the forward direction. In that case, a boundary constraint has been reached. When the point is reached where the skateboarder can go no farther in a particular direction, data simulating the boundary constraint is created. The boundary constraint in the case of the skateboarder need not be absolute, thus allowing the skateboarder to change direction and head down the same curved wall. When the skateboarder crashes, then the boundary constraint is absolute.

Referring to FIG. 1, the content data input device 12 is in communication with a processor 13. (Processor 13 can serve all of the functions described herein or each function can be carried out by individual processors.) The data used to simulate texture, uphills/downhill, boundaries, or gravity, is translatable into a brake control. Thus, a brake (not shown) in communication with the viewer input device 14 can change the way in which the viewer input device responds to the commands of the viewer. Thus the content data input device has a set of programmed commands such as the magnitude and/or timing of the brake response which are stored in the content data storage 16 for retrieval during the viewer's use of the system and method of the present invention. The magnitude and/or timing of the brake response is discussed in detail below.

While the content data is stored in the content data storage 16, the prerecorded visual data is stored in video data storage 17. For example, frame sequences can be stored on a single laserdisc as separate disconnected sequences, like tracks on a music CD or chapters in a book. The prerecorded visual data can take any form such as digital or analog, the images be shot or animated, or can a combination of both, or the images can be stills as well. The content data and the prerecorded visual data are correlated and when replayed, are accessed by the processor 13 simultaneously so that they can be experienced by the viewer substantially simultaneously.

The viewer input device 14 may be a rotatory device such as a knob, a "browsewheel," a crank or a trackball. The viewer input device may be also a mouse joystick or another suitable input device. When using a knob, browsewheel or crank, a rate-controlled "shuttle" control and position-controlled "jog" control can be used.

In the viewing mode of the present invention, the user views the prerecorded visual data on display 11, the data being generated from data stored in the video data storage 17 and processed by processor 13. While the viewer has control over the frame rate through viewer input device 14, in accordance with the present invention, the processor 13 provides signals to the viewer input device to give the viewer a haptic sensation as the viewer advances through the frames in either the forward or backward directions.

Figure 2:
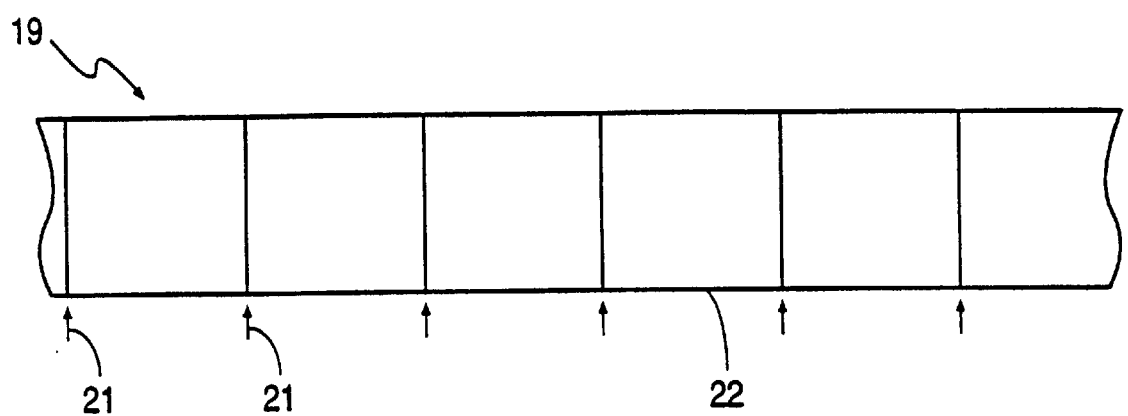
FIG. 2 depicts a section of film having particular points thereon marked.

FIG. 2 depicts video or film footage 19. The present invention is also applicable to digital data, stored on a laser disc or the like. Arrows 21 represent time codes or stamps, the number of which corresponds to the time in hours, minutes and, seconds of the footage. In one application, time codes are interpreted as edit points for use in editing. In accordance with the present invention, the time codes are used to correlate the video data with the content data. Film footage 19 is a prerecorded plurality of frames, distinguishable from generated images which are provided in real-time, such as computer generated images.

Figure 3:
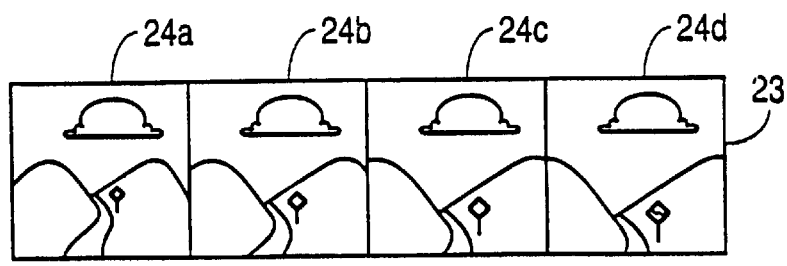
FIG. 3 is a blow up of a section of the film of FIG. 2 including frames of footage shot of landscape scenery as one is traveling on a road.

Between time codes, there may be several frames. For example, FIG. 3 is a blow up of a section 22 which contains four sequential frames 23. These four frames represent landscape in a moviemap, were the footage was taken from a car as the car was moving in the forward direction down a road. The content data played in conjunction with the frames is created so that it is correlated to dips and bumps in the road that the footage has captured as the car advances. In that case, in advancing the frames by using the viewer input device, the viewer senses data simulating the texture of the ride in the car.

Frame 24*a* depicts a stop sign far off in the distance while frames 24*b* and 24*c* depict the car approaching the stop sign. Frame 24*d* depicts the car having reached the stop sign and braking to a stop. In providing feedback signals to the viewer input device based on the content of prerecorded image data, the present invention takes into account that it is preferable to provide the illusion of a mechanical stop. Therefore, the present invention provides the illusion of release without much "stickiness".

Figure 4:
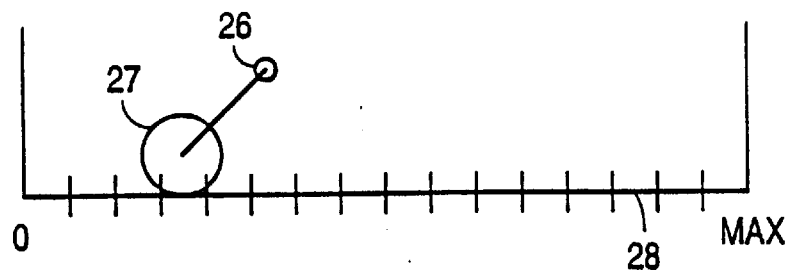
FIG. 4 shows a rotary device located on a scale of positions, wherein "MAX" indicates a braking position and "0" indicates another braking position.

FIGS. 4 and 5 both depict the concept of the boundary constraint of a full brake stop. Turning to FIG. 4, a crank arm 26 is depicted in communication with a ball or cylinder 27. The ends of the horizontal line 28 represents boundary conditions where for example, "MAX" is equivalent to the full brake stop in frame 24*d* and "0" is equivalent to the starting position of the car (not shown). In FIG. 5, wall 31 depicts the brake zone. An arrow 32 shows the brake being applied, to come to a full stop at the brake zone 31. In a mechanical system, when an object hits the wall, it is stopped in only one direction and rebounds as shown by arrow 33. However, it has been found that when a brake, such as in a haptic feedback system is applied for a full stop , there is no motion in the reverse direction because the brake is on, and therefore the system feels unnatural (sticky). It is preferable to create a sense of release or rebound after braking to best capture the feel of a mechanical breaking system.

Turning to FIG. 6, a system of the present invention may include a rotary shaft coupling device 36 which couples a hand control element 37 such as a crank handle or a browsewheel to a brake 38. A shaft 39 is in communication with a highly accurate shaft encoder 41 such as an optical encoder to encode the shaft motion. For example, a shaft encoder providing 5,000 counts per revolutions is preferable. Turning the browsewheel 37 by hand changes the optical encoder output, which is translated by a processor 42 to simultaneously change the frame position of the video laserdisc player at box 43 and change the resistance of the variable brake. Changes in the resistance of the variable brake are dependent on the content of the video material stored on the laserdisc.

Figure 8:
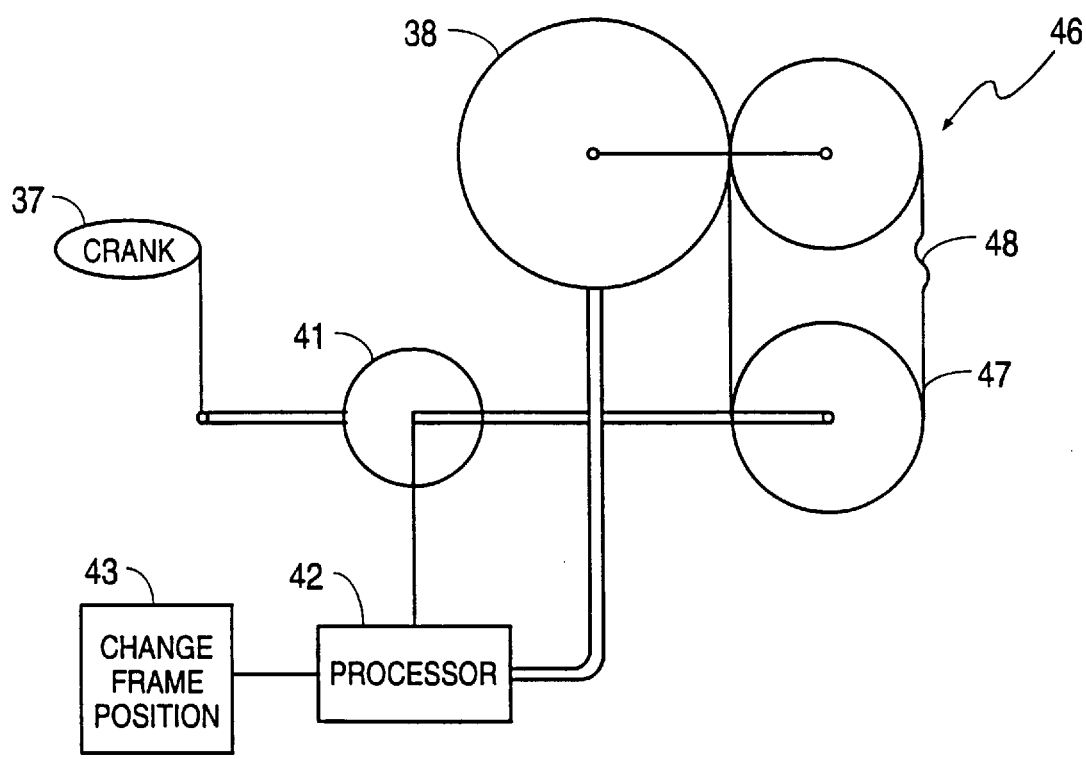
FIG. 8 is depicts another embodiment of a viewer input device in communication with a brake.

As mentioned above, it is preferable to capture the feel of a mechanical system in accordance with the present invention. In so doing, in one embodiment the rotary shaft coupling device 36 includes a flex coupling device 44 which is blown up in FIG. 7. In this embodiment, the flex coupling provides a small amount of flexibility in the shaft. With sensors, particular types of motion which are caused by a change in the motion of the shaft rotation are detectable. A different embodiment is depicted in FIG. 8, where the brake 38 is coupled to a chain link system 46 having a chain 47. By providing the chain with a little slack 48, a small change in the motion of the shaft is detectable. Accordingly, the feeling of a mechanical stop is effected because the system then induces a release when such conditions are sensed.

Alternatively, replacing the brake with a programmable motor provides active self-contained movement by the input device as well as variable resistance, i.e. it turns by itself. For example, the user input device moves on its own if the video material is of a car moving downhill. Such a replacement further enhances the feeling of tight coupling and control with the image content.

Figure 9:
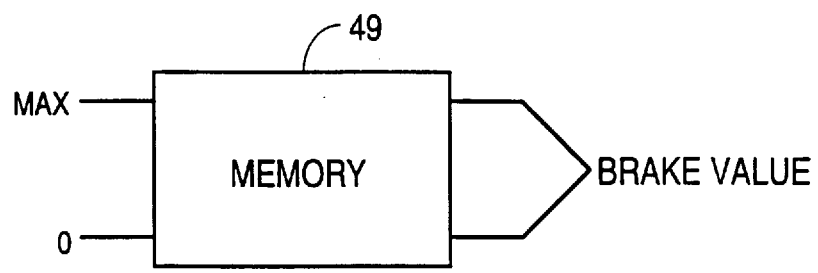
FIG. 9 illustrates the memory device responsible for the brake value depending on whether the rotary device has reached MAX or 0 as depicted in FIG. 4
Figure 10:
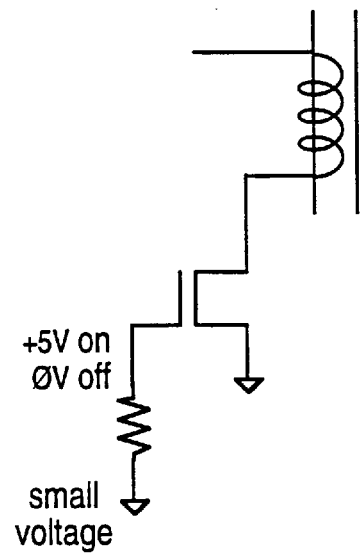
FIG. 10 shows a portion of a DC circuit for turning off and on the brake of the present invention.
Figure 11:

Turning to FIG. 9, there is shown a memory 49 for applying different amounts a brake depending upon digital MAX and 0. That is, to induce variable brake values digital inputs are sent to the braking system. Such a circuit configuration is shown in FIG. 10 where in a DC circuit for applying voltage to the brake. Variable braking values are effected by turning "off" and "on" the voltage at different rates. As shown in FIG. 11, by generating a signal having variable pulse-width-modulation, different brake values are possible. However, it has been found that by using a constant pulse, the brake has a tendency to resonate and provides an audible noise. That is the brake acts like a small EM speaker device.

Accordingly, instead of varying the pulse width to vary the brake value, the present invention includes a pseudo random number generator, a greater-than comparator, and a register. The pseudo random number generator generates a random number between 1 and 255. This value is continually compared to a register holding the brake value (0 to 255). For example, using a generator which generates 1 through 255, if one were to set it at 126, then there are half high values and half low values, and the output is the average of high to low. By providing a good random distribution of pulses, changing at arbitrary times, there is no period to the noise and therefore there is no resonance.

Figure 13:
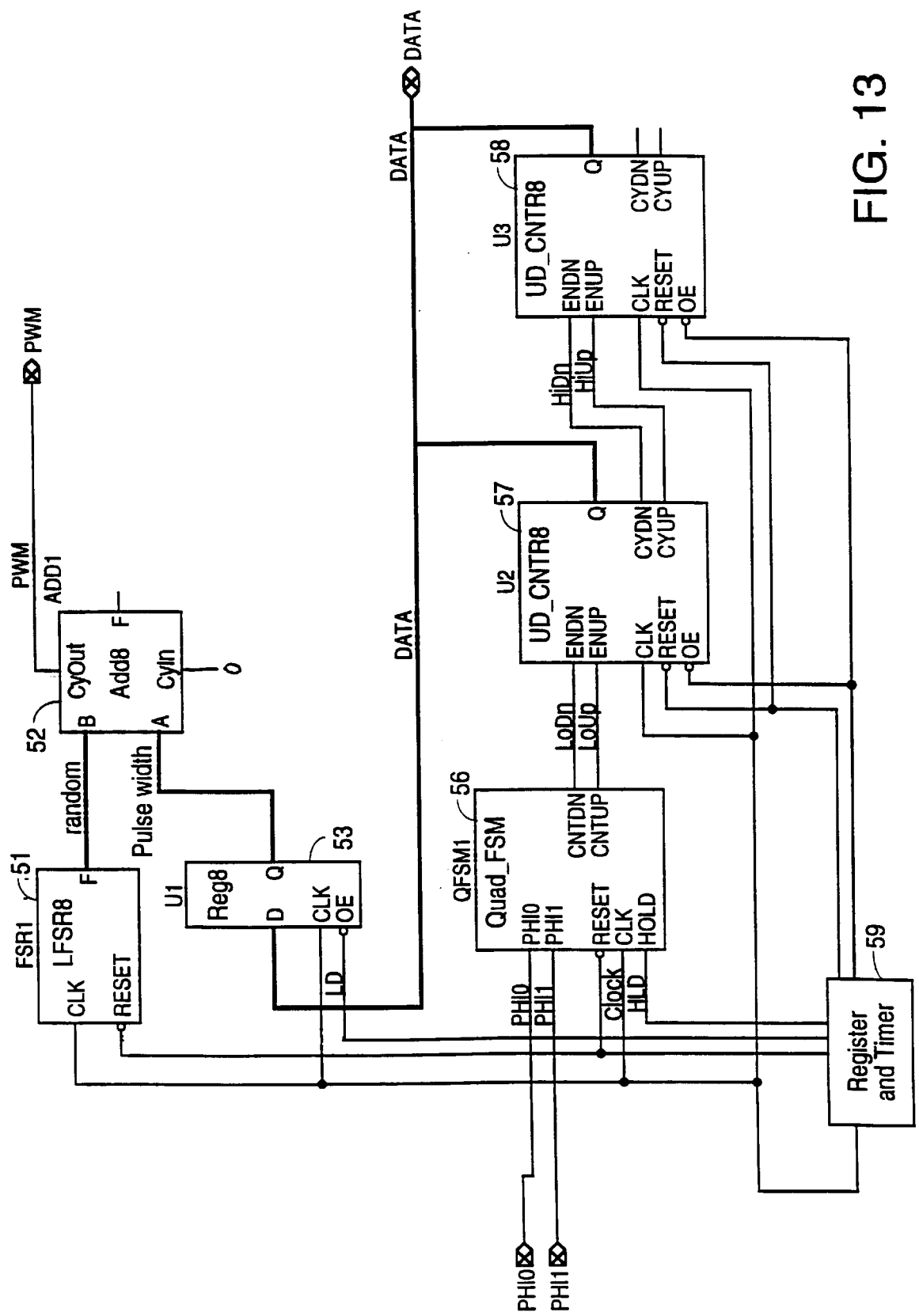
FIG. 13 is a circuit diagram of a circuit providing some functions of the present invention.

Turning to FIG. 13, a random number generator circuit diagram and a quadrature counter circuit used in accordance with the present invention is shown. In the random number generator circuit, a programmable integrated circuit 51 is in communication with a comparator 52 which is further communication with a register 53.

Figure 12:
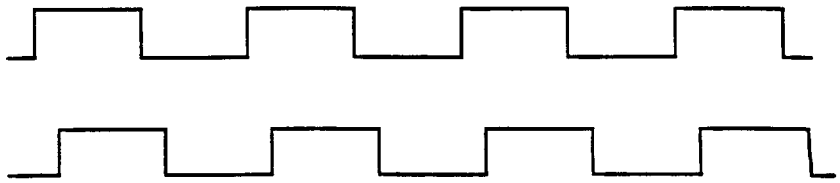
FIG. 12 shows a quadrature signal configuration used in accordance with the present invention to indicate in which direction the viewer is turning the user input device.

The quadrature counter circuit portion of the circuit depicted in FIG. 13 is provided to determine at a given position whether the frames are moving in a forward direction or in the backward direction. Quickly turning to FIG. 12, by offsetting the signals by less than a half period, the last known position can provide information about the direction of the given frame at a particular time.

Again referring to FIG. 13, the voltage is detected by quadrature circuit 56 which is in communication with, for example, a 24-bit counter 57 which is communication with a second counter 58. Those circuits are in communication with register 53 to receive counted information and interval timer 59 (integrated for convenience). Preferably, the interval timer is set to every 20 msecs. In this manner, the system is able to determine which direction the viewer is going and how far the viewer has come from information provided by the shaft encoder 41 (see FIGS. 6 and 7).

Figure 14:
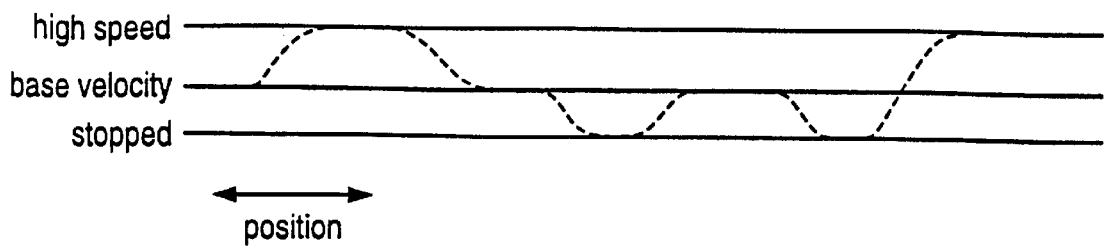
FIG. 14 depicts the variation in speed and direction a viewer provides to the system of the present/invention through the viewer input device.

In using a system in accordance with the present invention, it is common for a viewer to change the frame rate frequently, providing backtracks and stops. In such situations, it is preferable to provide a manner in which to avoid accidentally slipping into a brake zone. Turning to FIG. 14, three possible frame rate levels are denoted as being represented by parallel horizontal lines. The dotted line interwoven among the solid horizontal lines represents the stopping and starting of the user. As discussed above, the rotary encoder sends signals to be counted so that the position within the frame sequence can be detected. The important points for consideration here are boundary constraints as the starting point and the ending point, such denoted by position 0 (zero) and position MAX. According to the present invention, by using the counted position, the accidental slipping into the brake zone is avoided.

Figure 15:
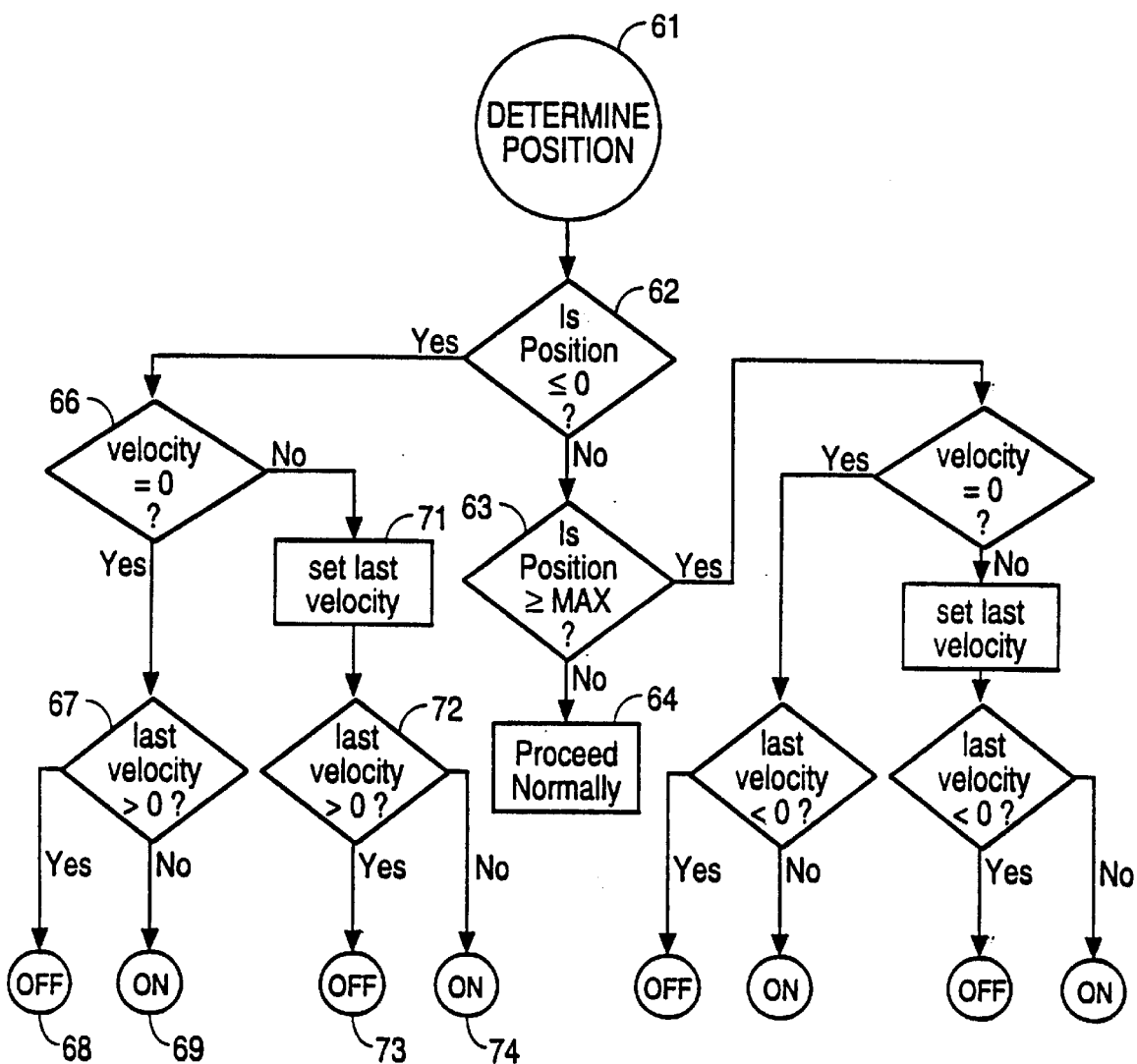
FIG. 15 is a flow chart of a method in which the present invention provides the ability to apply the brake given the variations depicted in FIG. 14.

Referring to the flow chart of FIG. 15, a manner in which to avoid slipping into the brake zone when the user moves too slowly is provided. The present invention provides a method for determining the position of the viewer in the film sequence by starting at box 61, such being flowcharted in FIG. 15. In the first decision box 62, the inquiry as to whether the position is greater than or equal to 0 is asked. If the answer is no, then the program asks whether the position is greater than MAX at box 63. If the answer is no, then the system proceeds normal as indicated by box 64. On the other hand, first referring to box 62, if the answer is yes, other conditions are considered. The portion of the flow chart depending from a yes answer to box 62 is symmetric to the portion of the flow chart depending from a yes answer to box 63. Therefore, only the portion relating to box 62 will be discussed herein, and the same meaning is applied to the portion relating to box 63.

If a position less than zero is detected, the next question is whether the velocity is zero at box 66. If the answer is yes, the program asks whether the last velocity was less than zero at box 67. If the answer is yes, the brake is turned off at box 68. If the answer is yes, the brake is turned on at box 69. On the other hand, if at box 66 the answer was no, then the program sets the velocity to the last velocity at box 71. If that last velocity was less than zero as questioned by box 72, then the brake is turned off at box 73. If the answer to box 72 is no, then the brake is turned on at box 74.

Another aspect of the present invention, is that according to the present invention, an amount of braking can be assigned depending upon the speed. A certain amount of braking based on speed provides advantageous effect. For example, where simulated centrifugal force to provide a haptic response to viewer input, braking is dependent upon content and velocity. In that case, the amount braking is a function of variables which can be programmed into the system.

Moreover, in the event that the viewer's strength is tested to adapt the viewer input device to a particular user, then the brake is applied in an adaptive manner and is therefore velocity dependent as well as content-dependent. In such a case, feed back generates a speed limit.

In view of the foregoing, the present invention interactively provides the viewer with a haptic experience based on the content of the prerecorded image data being viewed at a particular moment in time. While the present invention has been described in terms of a preferred embodiment, those skilled in the art will recognize that the invention can be practiced with modification and alteration within the spirit and scope of the appended claims.

We claim:

1. A system for interactively displaying a plurality of frames of prerecorded visual data, the system incorporating content-based haptic feedback, comprising:

means for storing a plurality of frames of the prerecorded visual data;

means for generating content data corresponding to a characteristic of the prerecorded visual data;

means for storing the content data;

means for processing the content data to generate a haptic feedback control signal corresponding to the characteristic of the prerecorded visual data;

a viewer input device for manually controlling the display on a display device of frames of the prerecorded visual data;

means for producing a display control signal in response to operation of the viewer input device;

means for generating a haptic feedback force based on the haptic feedback control signal, the haptic feedback force being correlated to the prerecorded visual data being displayed; and means for providing the haptic feedback force to the viewer input device.

2. A system as in claim 1, wherein the content data generating means comprises means for manually generating the content data.

3. A system as in claim 1, further comprising means for ascertaining the physical strength of a viewer, and wherein the processing means is adapted to produce the haptic feedback control signal in response to the ascertained strength of the viewer.

4. A system as in claim 1, wherein the content data generating means comprises means for automatically analyzing the prerecorded visual data and generating said content data based upon the analysis.

5. A system as in claim 1, wherein the haptic feedback force generating means comprises a brake.

6. A system as in claim 1, wherein the haptic feedback force generating means comprises a motor.

7. A system as in claim 1, wherein the haptic feedback force providing means comprises:

attachment means coupled to the viewer input device such that movement of at least or a part of the viewer input device corresponds to movement of the attachment means; and means for coupling the haptic feedback force generating means to the attachment means.

8. A system as in claim 7, wherein the attachment means comprises a shaft, such that movement of at least a part of the viewer input device corresponds to rotation of the shaft.

9. A system as in claim 7, wherein the coupling means comprises a flex coupling apparatus.

10. A system as in claim 7, wherein the coupling means comprises a slacked chain link apparatus.

11. A system as in claim 7, wherein the display control signal producing means comprises an optical encoder in communication with the attachment means.

12. A system as in claim 7, wherein the processing means further comprises a pseudo random number generator for use in generating the haptic feedback control signal.

13. A method for interactively displaying a plurality of frames of prerecorded visual data, the method incorporating content-based haptic feedback, comprising the steps of:

storing a plurality of frames of the prerecorded visual data;

generating content data corresponding to a characteristic of the prerecorded visual data;

storing the content data;

processing the content data to generate a haptic feedback control signal corresponding to the characteristic of the prerecorded visual data;

manually controlling the display on a display device of frames of the prerecorded visual data with a viewer input device;

producing a display control signal in response to operation of the viewer input device;

generating a haptic feedback force based on the haptic feedback control signal, the haptic feedback force being correlated to the prerecorded visual data being displayed; and providing the haptic feedback force to the viewer input device.

* * * * *

UNITED STATES PATENT AND TRADEMARK OFFICE
CERTIFICATE OF CORRECTION

PATENT NO. : 5,816,823  
DATED : October 6, 1998  
INVENTOR(S) : Naimark et al.

Page 1 of 2

It is certified that error appears in the above-identified patent and that said Letters Patent is hereby corrected as shown below:

Title page,
Delete "Attorney, Agent, or Firm - David R. Graham

Column 1,
Line 23, delete "frame" and substitue -- fps --;
Line 24, delete "fps" (second occurrence) and substitute -- frame --;
Line 57, delete, "results" and substitute -- results --;

Column 2,
Line 50, delete "is";

Column 3,
Line 15, delete "is";
Line 21, after "4", insert -- ; -- ;
Line 33, after "present", delete -- / --;

Column 4,
Line 26, after "while", insert -- , --;
Line 28, after "arc", insert -- to --;
Line 36, after "the" (second occurrence), insert-- footage --;
Line 37, delete "was" and substitute -- is --;
Line 44, delete "was" and substitute -- is --;
Line 50, delete "was" and substitute -- is --;
Line 57, delete "farther" and substitute -- further --;

Column 5,
Line 13, after "in", insert -- a --;
Line 17, after "images", insert -- can--;
Line 18, delete "can";
Line 24, delete "rotatory" and substitute -- rotary --;
Line 26, delete "be also" and substitute -- also be --;
Line 43, after "and", delete --, --;
Line 54, delete "were" and substitute -- where --;

UNITED STATES PATENT AND TRADEMARK OFFICE
CERTIFICATE OF CORRECTION

PATENT NO. : 5,816,823
DATED : October 6, 1998
INVENTOR(S) : Naimark et al.

It is certified that error appears in the above-identified patent and that said Letters Patent is hereby corrected as shown below:

Column 6,
Line 7, delete "represents" and substitute -- represent --;
Line 8, after "where", insert -- , --;
Line 12, delete -- , --;
Line 16, after "system", insert -- , --;
Line 20, delete -- breaking --;
Line 22, after "a", insert -- braking --;
Line 59, delete "a brake" and substitute -- of braking --;

Signed and Sealed this

Twenty-first Day of August, 2001

Attest:

*Attesting Officer*

NICHOLAS P. GODICI
*Acting Director of the United States Patent and Trademark Office*